Feb. 23, 1954
N. W. ROOP
2,670,234
FOOD-SERVING APPLIANCE
Filed Oct. 1, 1951
2 Sheets-Sheet 1
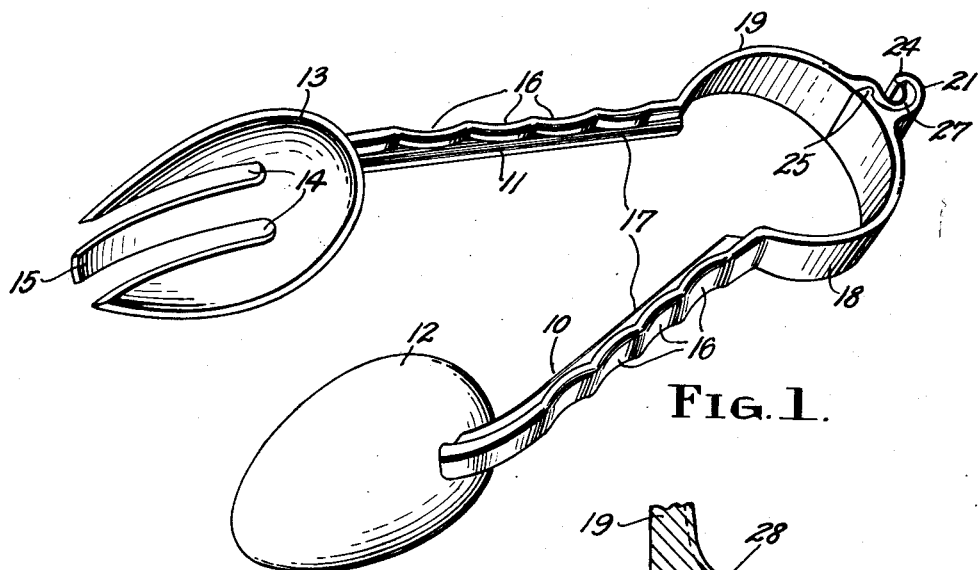
Fig. 1.
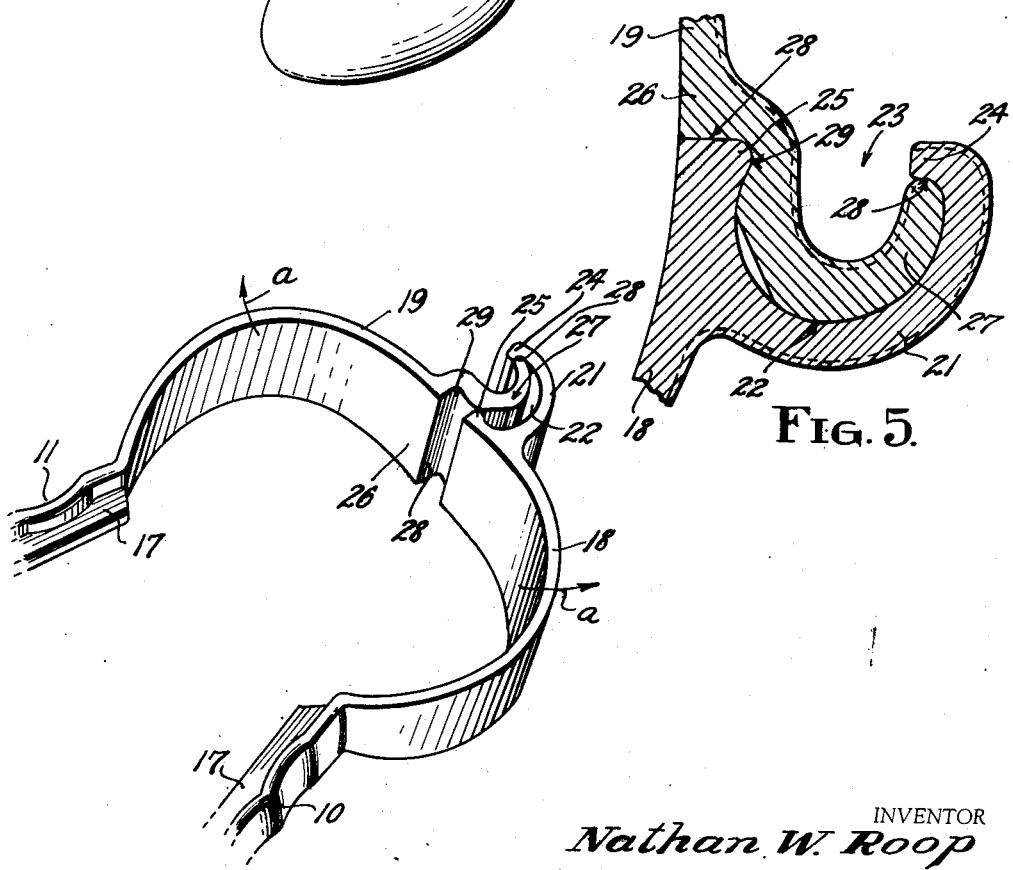
Fig. 5.
Fig. 2.
INVENTOR
Nathan W. Roop
BY *[signature]*
ATTORNEY Feb. 23, 1954  N. W. ROOP  2,670,234
FOOD-SERVING APPLIANCE
Filed Oct. 1, 1951

INVENTOR
*Nathan W. Roop*

BY *W. S. McDowell*

ATTORNEY

Patented Feb. 23, 1954

2,670,234

UNITED STATES PATENT OFFICE 2,670,234

FOOD-SERVING APPLIANCE

Nathan W. Roop, Columbus, Ohio, assignor to Columbus Plastic Products, Inc., Columbus, Ohio, a corporation of Ohio Application October 1, 1951, Serial No. 249,154

1 Claim. (Cl. 294—99)

This invention relates to culinary appliances, having particular reference to appliances of the type employed in the handling of loose bulky foods offering considerable spatial mass, such as leaf salads or the like.

An object of the invention is to provide an appliance in the form of a pair of tongs and embodying a plurality of shank or jaw members which are joined at their inner ends by a spring bow, the latter being so constructed as to permit the shank members to be relatively disconnected for separate use when desired.

A further object of the invention is to provide food-serving tongs composed of a pair of separable members, each of which comprises an integral one-piece molding produced from a thermoplastic or a thermosetting resin.

Still another object of the invention is to provide food tongs having incorporated therein novel features of construction and assembly by which the tongs are adapted to a wider field of use than tongs of conventional design.

For a further understanding of the invention, reference is to be had to the following description and the accompanying drawings, wherein:

Fig. 1 is a perspective view of a pair of food tongs constructed in accordance with the present invention;

Fig. 2 is a fragmentary perspective view disclosing the bowed resilient ends of the head-carrying shank members of my improved tongs, and illustrating the molded detachable union which provides for the separation of said members;

Figure 3:
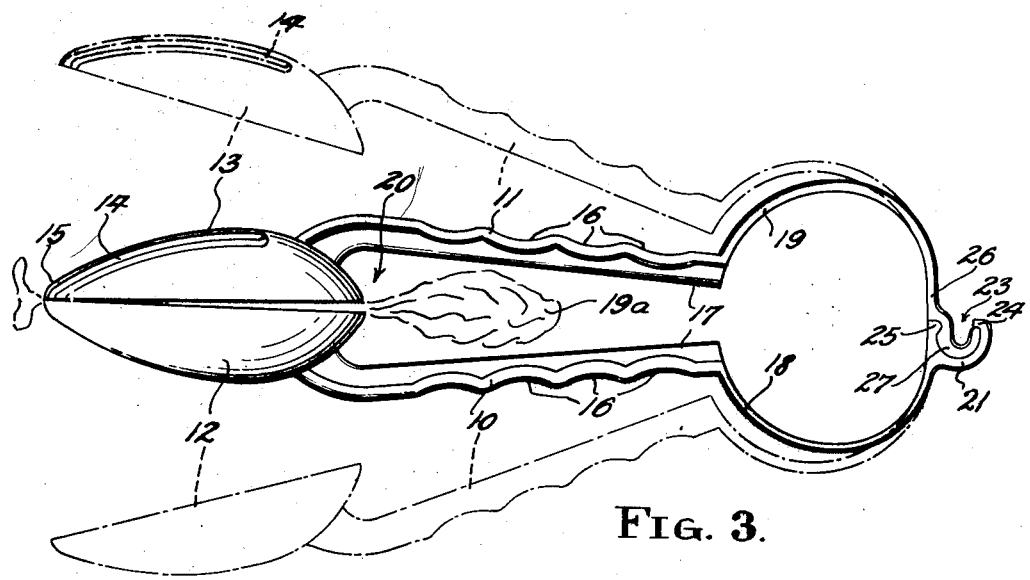

Fig. 3 is a top plan view of the food tongs of the present invention, disclosing in full lines the tongs in their position of closure in gripping articles of food between the heads thereof, setting forth the spacing of the shank members of the tongs to permit food articles to be disposed between the same without pinching. In this figure the normal or released position of the tongs is shown by dotted lines.

Figure 4:
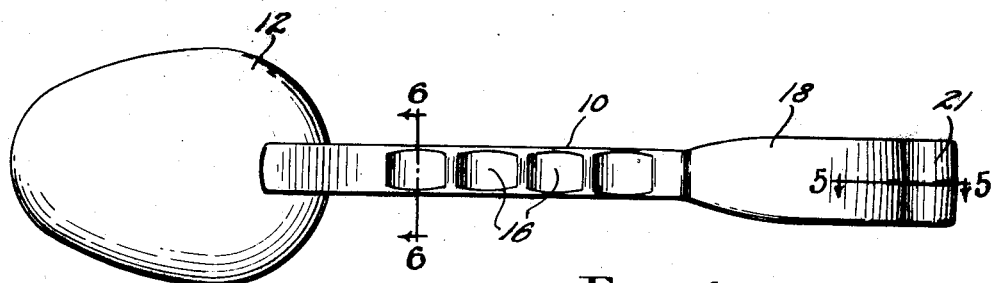
Figure 6:
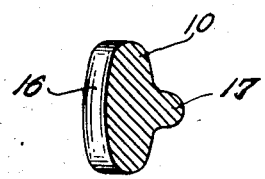

Fig. 4 is a side elevational view of the tongs;

Fig. 5 is a detail horizontal sectional view taken on the line 5—5 of Fig. 4, and developing in horizontal cross section the molded detachable union provided between the shank elements of my improved food tongs;

Fig. 6 is a vertical transverse cross-sectional view taken on the line 6—6 of Fig. 4.

The food tongs of the present invention comprise a pair of shank members which are formed to provide a resilient bow at one end of each thereof and a food-contacting or receiving head at the opposite end of each member. These heads are shaped to constitute spoon or fork bowls, so that when the shank members are forced toward each other by hand-executed pressure, and against the resistance offered by the spring bow formation thereof, the heads carried by the outer ends of said members may be brought into gripping and holding engagement with the food products or other articles, such as lettuce, green salads or ice cubes, whereby to enable such relatively awkward and bulky food products to be surely handled, as in the act of transferring the same from receiving bowls to table plates. One of the particular features of the invention resides in forming the spring bows of the shank members with integral molded interfitting tongue and socket formations, which, while permitting the tongs to be readily operated as a composite utensil, yet enable the shank members of said tongs to be disassociated when desired so that the same may be used separately or individually. Again, the shank members are so formed that when the same are forced together to bring the heads on the outer ends thereof into gripping engagement with articles of food, a space will remain between the inner surfaces of the adjoining shank members into which the articles of food may project, and without being pinched or bruised by the action of the shank members. Also, another important feature of the invention resides in so constructing the individual members of the tongs as to enable the same to comprise one-piece moldings or castings, whereby simplicity and economy in the manufacture thereof will be obtained.

With these general features in view, the improved food tongs of the present invention comprise shank members disclosed at 10 and 11 in the accompanying drawings. In this instance, the shank member 10 has been shown as having the outer end thereof provided with an enlarged food-gripping and serving head 12, which partakes of the formation of an enlarged serving-spoon bowl. Likewise, the member 11 has its outer end formed with a complemental head 13, which is of the same general proportions as the head 12, except that the head 13 provides a plurality of elongated slots 14 which are separated by a fork-like tine 15, whereby to enable the head 13 to function in the combined capacity of a food-gripping element, a table or serving spoon, a fork, and a food strainer. These attributes are particularly important in enabling the appliance to function usefully in the handling and serving of mixed salads, The shank members 10 are preferably corrugated longitudinally thereof as indicated at 16, so that such shank members may be more securely gripped and engaged by the fingers of the user. Further, the strength thereof is increased by the provision of a longitudinally extending reinforcing rib 17 arranged on the inner side of each of said members, as shown more particularly in Figs. 1 and 6.

The shank member 10 terminates at its inner end, that is, the end opposite to the head 12 thereof, in a semicircular bow 18, and, likewise, the shank member 11 has its inner end terminated in a complemental bow 19. Through these bowed regions resiliency is imparted to the shank members 10 and 11, the resiliency being such as to cause said shank members normally, and when released, to assume the positions of Fig. 1, or the broken line positions shown in Fig. 3. This resiliency or spring action on the part of the bows 18 and 19 may be overcome by the employment of pressure exerted manually and inwardly on said shank members, so that the latter may be forced together to assume the full line positions of Fig. 3, in which the heads 10 and 11 of said shank members grip articles of food, indicated at 19, therebetween, securely holding such articles in association with the tongs. However, it will be observed by reference to Fig. 3 that the shank members 10 and 11 are spaced when the heads 12 and 13 thereof are forced together. This spacing is indicated at 20, and it will be noted that the same is of sufficient magnitude so that the articles of food gripped between the heads 12 and 13 and projecting rearwardly thereof, will occupy such spacing without being injured or pinched by engagement with the shank members 10 and 11.

Another important feature of the present invention resides in so uniting the bowed ends 18 and 19 of the shank members as to permit of their ready dissociation or detachment from one another. Inasmuch as each of the shank members comprises a one-piece molding, it is highly desirable to form the attaching means so that the same will constitute integral constituent parts of said shank members. I have achieved this result by the construction disclosed in the drawings, wherein it will be noted that the bow of the shank member 10 terminates in an arcuate tongue 21 of semicircular formation, the same forming a socket 22 having a mouth 23 of restricted width, such restriction being produced by forming the tongue 21 at its outer end with an inwardly directed lip 24, the said lip being disposed in opposing relationship to an integral rounded projection 25 extending outwardly and laterally from the end 26 of the bow 18.

Similarly, the bow 19 of the shank member 11 terminates in a semicircular finger extension 27, the outer end of which being adapted for engagement with the shoulder 28 of the lip 24, while a groove 29 forms the juncture of the finger extension 27 and the bow 19 is adapted to receive the projection 25 of the bow 18.

Normally, the width of the finger extension 27, when measured across the distance existing between the groove 29 and the outer edge of the extension 27, is greater than that of the mouth 23 of the socket 22, so that both the tongue 21 and the extension 27 will be flexed and placed under tension when the parts are forced together from the position disclosed in Fig. 2 of the drawing to the finally assembled position disclosed in Fig. 5. The flexing tension thus created produces sufficient friction between adjacent parts as to firmly maintain the two moldings comprising the composite tongs in their assembled formation. However, when it is desired to separate the shank members so that the two parts of the tongs may be used separately, the application of outwardly directed forces, as indicated by the arrows a, will effect such flexure as to remove the projection 25 from the groove 29, allowing ready separation of the parts. Reversely applied pressures, of course, are used to reassemble the parts in operative tong formation.

In view of the foregoing, it will be seen that the present invention provides a pair of food-serving table tongs which are formed to comprise a pair of molded members of plastic composition. These members may be readily assembled or separated, as desired, to produce a culinary appliance having a considerably wider field of usefulness than conventional food tongs of one-piece construction and in which the shank members are permanently united. The members of my improved tongs are so formed that they lend themselves readily to formation in conventional heated molds employed in the commercial production of plastic articles, and for this reason my improved construction is capable of being manufactured at a low cost. At the same time, a very useful appliance of pleasing appearance is provided.

While the preferred form of the invention has been set forth in considerable detail, nevertheless it will be understood that the construction is subject to certain variations or modifications without departing from the spirit and scope thereof as set forth in the following claim.

I claim:

A food-serving appliance comprising: a pair of members each composed of an integral one-piece molding, each of said members being formed at one end thereof with a resilient bowed extension and at the opposite end thereof with an enlarged food-receiving and manipulating head, the first of said extensions terminating in an outer semi-circular tongue element formed with a lip at its outer end, the second of said extensions terminating in an inner complemental tongue element slidably received within and embraced by the outer tongue element, the outer end of said inner tongue element terminating in contact with said lip.

NATHAN W. ROOP.

References Cited in the file of this patent

UNITED STATES PATENTS

| Number | Name | Date |
| --- | --- | --- |
| 1,260,302 | Barrows | Nov. 26, 1918 |
| 1,380,232 | Metcalf | May 31, 1921 |
| 1,806,441 | Bauer et al. | May 19, 1931 |
| 2,483,985 | Sonn | Oct. 4, 1949 |
| 2,560,376 | Waterman | July 10, 1951 |